Dec. 16, 1969 P. T. BRADY 3,483,941

SPEECH LEVEL MEASURING DEVICE

Filed Jan. 26, 1968 3 Sheets-Sheet 1

INVENTOR
P. T. BRADY
BY R. B. Ardis
ATTORNEY

Dec. 16, 1969 P. T. BRADY 3,483,941

SPEECH LEVEL MEASURING DEVICE

Filed Jan. 26, 1968 3 Sheets-Sheet 2

United States Patent Office 3,483,941
Patented Dec. 16, 1969

3,483,941

SPEECH LEVEL MEASURING DEVICE

Paul T. Brady, Middletown, N.J., assignor to Bell Telephone Laboratories, Incorporated, Murray Hill, N.J., a corporation of New York
Filed Jan. 26, 1968, Ser. No. 700,828
Int. Cl. G10k *11/00;* H04m *1/00*
U.S. Cl. 181—.5 7 Claims

ABSTRACT OF THE DISCLOSURE

This disclosure relates to apparatus which provides a measure of speech signal level by determining the equivalent peak level of the probability density distribution. To this end, a transducer converts the speech signal into an electrical analog signal and the electrical signal is then successively squared, in a voltage squarer, accumulated over a given period, in an accumulator circuit, and divided by a divider network to provide the root-mean-square of the electrical analog of the speech signal. Comparator circuitry then determines the difference between the derived RMS value and selected threshold level voltage, and a quantity (Δ) is formed therefrom which is selectively added to said threshold level to provide a measure of said equivalent peak level.

BACKGROUND OF THE INVENTION

This invention relates to a speech measuring device and, in particular, to an automatic device for measuring speech levels.

The measurement of the intensity of human speech is a problem of great importance in the design and operation of a communication system. The parameters, such as root-mean-square or average voltage, used to describe a periodic signal, often have little or no meaning when applied to complex speech signals which include both periodic and nonperiodic portions. Yet, in order to design and operate a communication system so as to prevent system overload or extreme signal distortion, the level of the complex electrical signal derived from the acoustic speech waveform must be characterized in some meaningful manner. It has been discovered that the probability distribution of the logarithm of a full-wave rectified speech signal's envelope above a wide range of thresholds is approximately uniform, despite the infrequent occurrence of singular loud sounds, when the envelope of the speech signal is determined in a specified manner. Moreover, it has also been discovered that when the logarithm of the amplitude of a rectified speech signal's envelope over a selected short time period possesses a truly uniform probability distribution, the peak value of this distribution is a good measure of the signal's intensity. This follows because the peak level of the probability distribution defines the upper end of the probability distribution since the distribution is rectangular in shape and represents the speech level. The lower end is defined by an arbitrary threshold, and is unimportant in describing the peak level, since as speech level changes, only the upper end is affected. Thus, a one-dimensional measure of the peak value or a value related to the peak may serve as an effective measure of the speech level.

In my previous application Ser. No. 460,108, filed June 2, 1965, now Patent No. 3,346,694, an automatic device to obtain a one-dimensional measure of the speech level was disclosed which provided significant advantages over the prior art. In particular, my prior speech measuring device was automatic and, therefore, free from objectionable human error. Whereas prior art devices when measuring speech levels introduce significant errors, my prior speech measuring device reduced the measured deviation to less than one decibel over a threshold level variation of fifteeen decibels.

My prior speech level measuring device provided consistent readings over a threshold level variation of 15 db. For a given signal amplitude, the meter provided a specific peak level reading. When a new threshold level was set, the meter provided the same peak level reading for the same signal. Thus, for different threshold level settings, the peak value as determined by my prior device was approximately the same. This consistency in readings was realized over a threshold level variation of 15 db. As the signal amplitude changed, the peak level also changed, and the peak level determined by my previous meter for signals was consistent over a 15 db range of signal amplitude, with a fixed threshold. Therefore, my prior speech level measuring device provided a one-dimensional measure of the speech level which was independent of the threshold level over a 15 db range.

The threshold level represents that level above which speech will be recognized by a measuring device. This level may vary significantly in the same transmission system and from one transmission system to another. In many situations, threshold level variations greater than 15 db may be encountered. My prior device will not provide consistent measurements when utilized in an environment in which the threshold level variations are greater than 15 db. Peak level measurements, as determined in my prior device, may be in error by as much as 8 db in an environment in which the threshold level varies by as much as 35 db.

My prior speech level measuring device determined the peak of the probability distribution with apparatus which formed the difference between the threshold and average log voltage of the speech sample, doubled this quantity, and added the resultant quantity to the threshold level. This process formed the average peak level of the probability distribution of the speech signal.

A correlative problem of my prior device in an environment where the threshold level varies over 35 db relates to its tracking property. When a speech signal in the transmission system is amplified by more than 15 db, my prior device provides a peak measure which, at least partially, does not correctly reflect the known level change.

An object of the present invention is to provide a one-dimensional measure of the level of speech which provides a consistent measure over a wide range of threshold levels.

Another object of the present invention is to provide a speech level measuring device which automatically provides a consistent measure for the level of speech over a wide range of threshold levels.

Still another object of the present invention is to provide a fixed threshold speech level measuring device which is capable of tracking variations in speech level encountered in a transmission system.

SUMMARY OF THE INVENTION

In accordance with the present invention, the above objects are accomplished by providing apparatus which measures the root-mean-square of the voltage ($V_{rms}$) of all parts of the speech signal exceeding the threshold, determines the difference between $V_{rms}$ and threshold, and forms another quantity Δ which is added to the threshold to determine an equivalent peak level of the probability density curve. The derived equivalent peak level is threshold level insensitive over at least a 35 db range.

DETAILED DESCRIPTION

Figure 1:
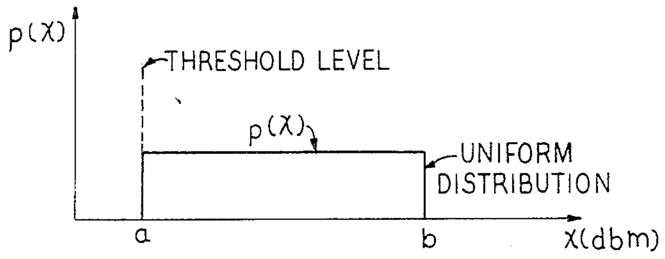
FIG. 1 represents a model of the probability density of the log of the absolute voltage of the speech signal as it appears above an arbitrary threshold *a*.

In my previous application, it was shown that the probability distribution of the log of the voltage of the speech signal is relatively uniform. The uniform distribution described in my previous application was based, in part, upon determining the envelope of the speech signal in a specified manner. In my present speech measuring device, the envelope of the speech signal is not determined in that specified manner and the variation from the uniform probability distribution is relatively slight. The theoretical uniform probability distribution is shown in FIG. 1 where *a* represents the threshold level of the log of the voltage of the speech signal. The probability distribution of the log of the voltage $p(x)$ is plotted against the variable $x$ in db. $p(x)$ is found to be approximately constant in the region where $x$ is realizable and thus $x$, the logarithm of the amplitude of the rectified speech signal, is uniformly distributed over the range of realizable speech amplitudes.

Since the probability distribution of the log of the voltage of the speech signal is relatively uniform, an effective measure of the level of the speech signal is the peak *b* of the log uniform density function shown in FIG. 1. This follows because the peak *b* for the uniform density distribution which has a rectangular shape defines the distribution which is a measure of the speech level. This peak was determined in my previous application by measuring the average log voltage of the speech waveform, obtaining the difference between this average and the threshold level, doubling this difference, and adding it to the threshold level in order to obtain the peak *b*. The theoretical principles utilized by my previous speech level meter are set forth in that application but, in actuality, the log uniform density function is not precisely uniform and this deviation causes the prior apparatus to render readings which are threshold dependent when the threshold varies over a wide range.

In accordance with the present invention, a more effective measure of the level of speech over a wide range of threshold levels which is insensitive to the threshold level may be determined by utilizing $V_{rms}$ of the speech signal. My previous speech level meter provided a measure of the speech level which was substantially independent of threshold level settings of the meter over a range of 15 db. In many situations, as above described, the threshold level varies by more than 15 db. It was found that when my previous speech level meter was utilized where the threshold level varied over a 35 db range, the measure produced by the meter varied up to 8 db. Thus, for this wider variation in threshold levels, my prior speech level meter provides readings which are threshold dependent.

In an article by me entitled "A Statistical Basis for Objective Measurement of Speech Levels" appearing in the September 1965 Bell System Technical Journal, pages 1453–1486, I disclose that the peak level may be obtained by using other than the average peak level as utilized in my previous device. In particular, I disclose that the peak of the probalility distribution may be obtained by utilizing the root-mean-square of all parts of the speech signal exceeding a threshold. The theoretical relationship between $V_{rms}$, the peak *b*, and the threshold is set forth in Appendix B of the article. A curve of the relationship of $V_{rms}$ above-threshold to the peak in decibels above-threshold is found in FIG. 9 and is reproduced in FIG. 2, curve 1, of the present application. This curve relates $V_{rms}$ above-threshold to the equivalent peak level (*epl*) above-threshold in decibels for the theoretical density function shown in FIG. 1. By utilizing curve 1 in FIG. 2, another curve may be derived which relates the equivalent peak level (*epl*) above-threshold to the threshold which is shown as curve 1 in FIG. 3 of this application. Curve 1 of FIG. 3 may be utilized to provide a measure of the speech level which would be threshold insensitive over at least a 35 db range.

In accordance with the present invention, a measure of the speech level is provided which is threshold insensitive over a threshold variation of at least 35 db by choosing an arbitrary threshold level and measuring $V_{rms}$ above-threshold. $V_{rms}$ above-threshold in db is, effectively, the average power above-threshold. The difference between $V_{rms}$ in db and the threshold is utilized to determine a new quantity $\Delta$ which, when added to the threshold, provides an equivalent peak level of the actual density distribution which is threshold insensitive over at least a 35 db range of threshold levels. The derived relationship between $V_{rms}$ above-threshold and the equivalent peak level above-threshold is shown as curve 2 in FIG. 2.

Figure 2:
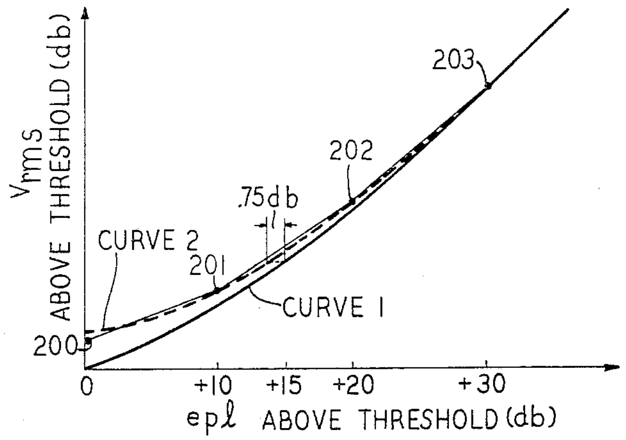
FIG. 2 comprises curve 1 which relates $V_{rms}$ above a threshold level to the difference between the peak and threshold level of the theoretical probability density curve shown in FIG. 1 and curve 2 which relates the $V_{rms}$ above-threshold level to the difference between the peak and threshold level of the actual probability density of a speech signal in order to derive a one-dimensional measure of the speech signal which is threshold level insensitive over at least a 35 db range.
Figure 3:
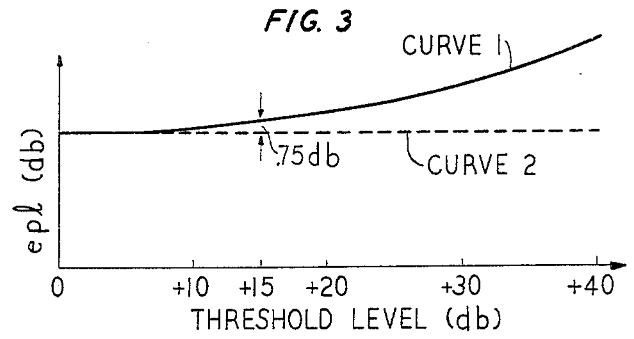
FIG. 3 comprises curve 1 which relates the equivalent peak level above-threshold to the threshold level and is the result of applying curve 1 of FIG. 2 to actual speech data and curve 2, which relates the equivalent peak level above-threshold to the threshold level and is the result of applying curve 2 of FIG. 2 to actual speech data.

The derivation of curve 2 in FIG. 2 may be most easily understood by referring to FIG. 3. For purposes of illustration, several threshold decibel levels are indicated in FIGS. 2 and 3. It may be assumed that at the decibel level reading of 0, the peak level of curve 1 in FIG. 3 is "correct." At the +15 db threshold level, the theoretical curve predicted by utilizing curve 1 of FIG. 2 yields an equivalent peak level about .75 db too high, as shown in curve 1 of FIG. 3. From this, it was discovered that the $V_{rms}$ readings for equivalent peak levels 15 db above-threshold were higher than theoretically predicted, yielding equivalent peak levels 15.75 db above-threshold. Therefore, that *rms* which yielded an *epl* 15.75 db above-threshold should instead have yielded an *epl* only 15 db above-threshold. To accomplish this, curve 1 of FIG. 2 should be moved 0.75 db to the left at the 15.75 db point on the abscissa. At higher thresholds, the theoretical curve of FIG. 2 is moved to the left by greater than .75 db, as determined by the difference between curves 1 and 2 of FIG. 3. The resultant curve is shown as curve 2 of FIG. 2.

Curve 2 of FIG. 2 can be approximated by a series of straight lines with the breaks indicated at points 201 and 202. The series of straight lines was utilized in determining $\Delta$ which is the difference between the *epl* and threshold level. When the new quantity $\Delta$ is added to the threshold level, an equivalent peak level is formed which, in accordance with the present invention, remains substantially independent of the threshold level and provides a consistent measure for the speech level with a threshold variation of at least 35 db. Each straight line approximation provides different criteria for the determination of $\Delta$. Thus, $\Delta_1$ would be determined in accordance with the straight line from points 200 to 201. Similarly, $\Delta_2$ and $\Delta_3$ would be determined by straight lines 201–202 and 202–203, respectively.

My present device provides an additional feature which derives from its ability to provide a consistent one-dimensional measure of the speech level over a threshold level range of 35 db. This additional feature is known as "tracking." As the signal level is amplified in a transmission system, the threshold level of the meter will remain fixed, and it is desired that the meter reflect the change in signal level on a db for db basis. In my previous application, a consistent measure of the speech level was obtainable where the maximum level variation was 15 db. Since amplification in excess of 15 db may be present in the transmission system, my previous device may not track properly while my present device provides a consistent measure of the speech level over a level variation of at least 35 db. Therefore, my present device may be used in transmission systems where the gain encountered in the system varies at least 35 db.

Figure 4:
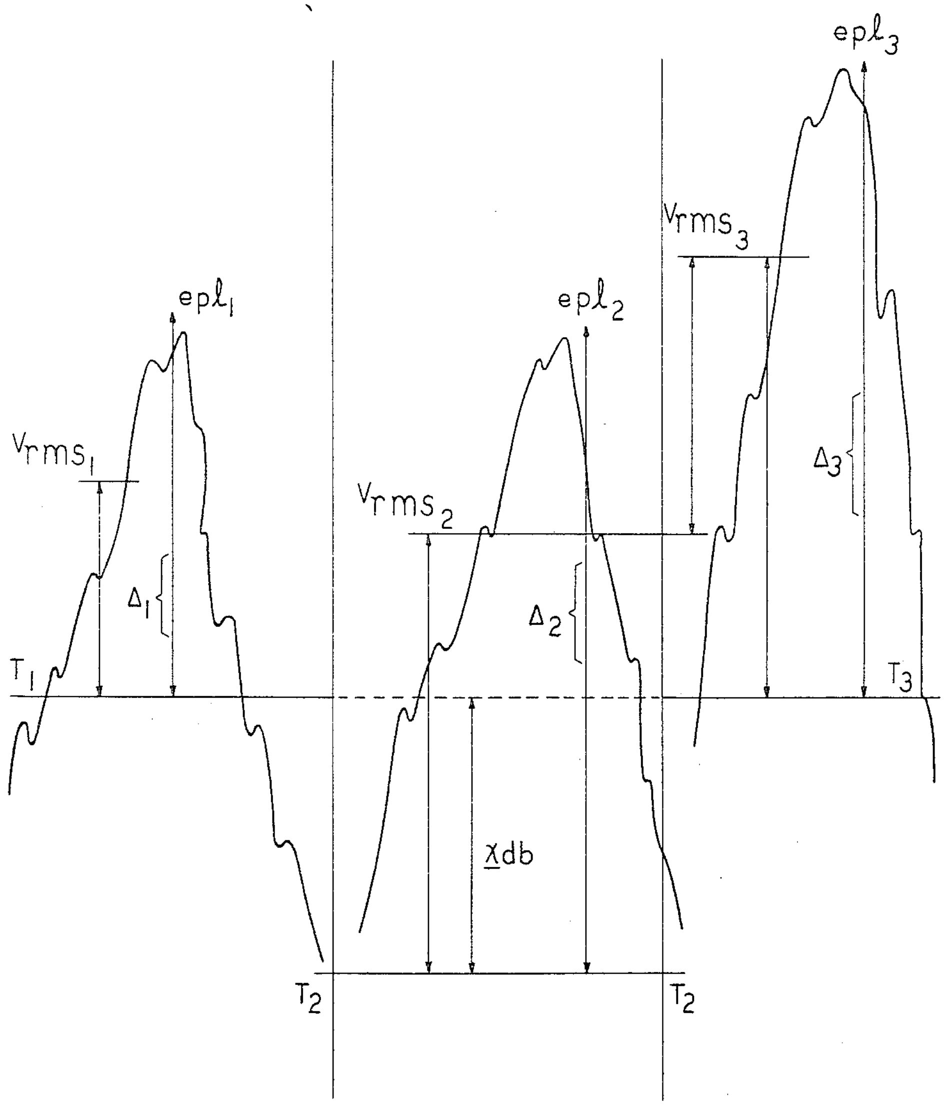
FIG. 4 shows several speech samples with associated threshold levels.

FIG. 4 is a graphical demonstration of the tracking property of my present device. The threshold invariance of my present device provides the tracking ability. Assume three equivalent peak level readings are taken of the same speech sample. Referring to FIG. 4, the first reading, $epl_1$, is made at threshold $T_1$. The second, $epl_2$, at $T_2$ which is $x$ db below $T_1$, and the third, $epl_3$, at threshold $T_3=T_1$ where the speech has been amplified by $x$ db. The speech waveform above-threshold of the third signal is the same as that of the second signal except that all points are $x$ db higher. Thus, $V^2$ and $V_{rms}$ are each $x$ db higher and $V_{rms_3}-V_{rms_2}=x$ db. Since $T_3-T_2=x$ db, $V_{rms_3}-T_3=V_{rms_2}-T_2$. In other words, $\Delta_3=\Delta_2$ and $epl_3-epl_2=x$ db. Threshold independence implies that $epl_1=epl_2$; thus, $epl_3-epl_1=x$ db. Since $epl_3$ and $epl_1$ are measured with the same threshold, $epl_3$ has correctly indicated an amplification of $x$ db, comparing condition 1 with condition 3. Thus, for a fixed threshold, the $epl$ will track known level changes over at least a 35 db threshold level range with the same accuracy as found in measurements of threshold invariance.

Figure 5:
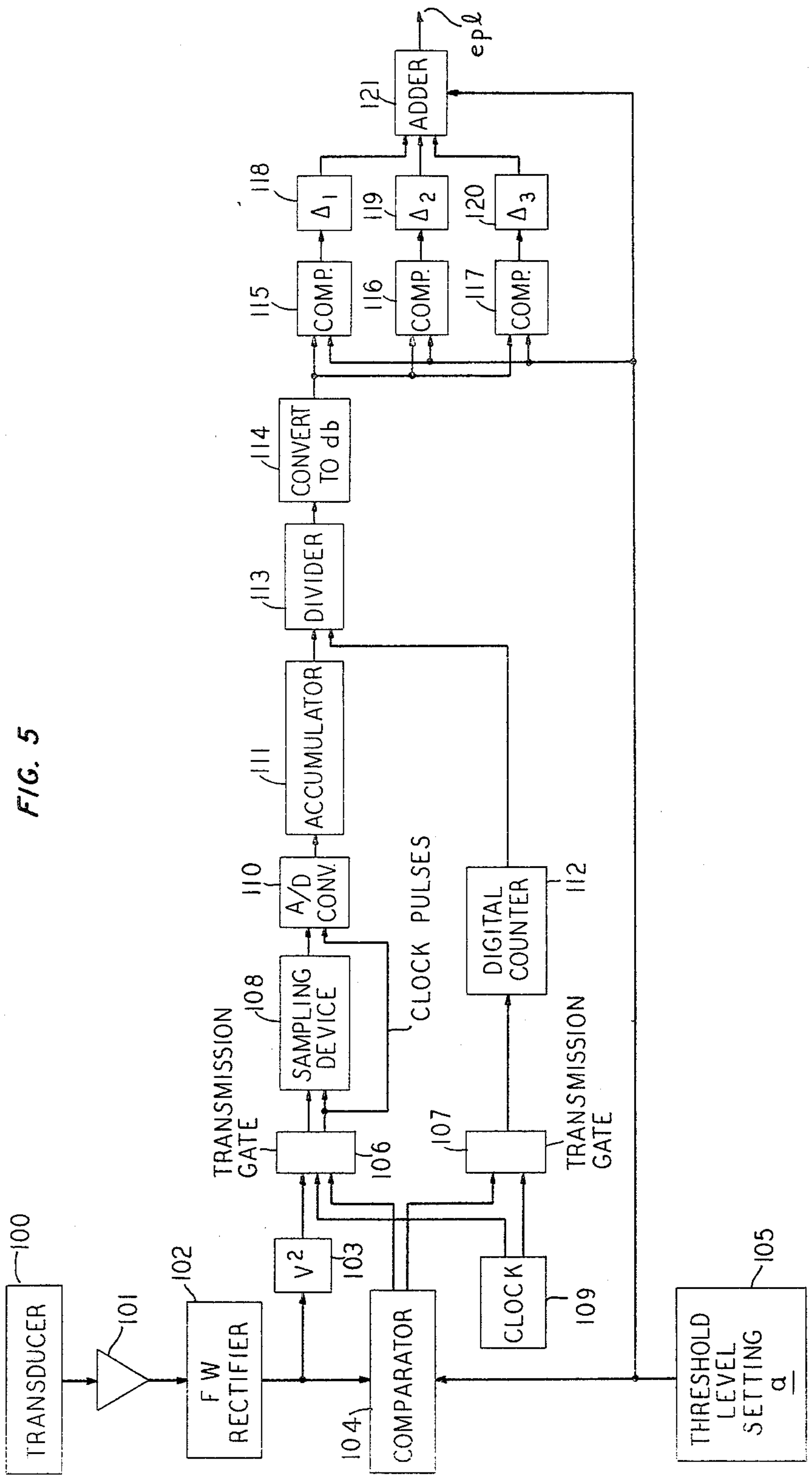
FIG. 5 is a block diagram of a peak level meter embodying the principles of the present invention.

The above considerations present the analytical basis for my new speech level measuring device. FIG. 5 is a block diagram of a speech level measuring device embodying the principles of my present invention. Speech sounds are detected by speech transducer 100 and converted into a complex electrical signal. This signal passes through amplifier 101 to full-wave rectifier 102. The signal may be half-wave rather than full-wave rectified, if so desired. The full-wave rectified speech signal is then fed to voltage squaring device 103 and comparator 104. Voltage squaring devices are well known in the art; for example, see Patent No. 3,113,274, issued to Orval L. Utt on Dec. 3, 1963. The threshold level in my speech measuring device is set by threshold level setting 105. The threshold level, as determined by the threshold setting 105, is supplied to comparator 104. During the time the signal from full-wave rectifier 102 is above the threshold voltage, comparator 104 enables transmission gates 106 and 107.

When transmission gate 106 is enabled, the squared voltage output produced by voltage squarer 103 is passed to sampling device 108. Transmission gate 106 also passes pulses from clock 109 to sampling device 108. Sampling devices that may be used in the present invention are well known in the art. For instance, see R. K. Richards, "Digital Computer Components and Circuits," 1954, pages 285–286. The clock pulses may be at a rate of 10 kc. or even possibly lower, as long as it is sufficiently fast enough to obtain a consistent measure of $V_{rms}$. The sampled signal in sampling device 108 is then supplied to an analog-to-digital converter ($A/D$) 110, as are the clock pulses. Analog-to-digital converters that may be used in the present invention are well known in the art. For instance, see "Pulse and Digital Circuits," by J. Millman and H. Taub, 1956, pages 491–494. Any of a variety of $A/D$ converters may be used in the present embodiment. A series of pulses are produced by $A/D$ converter 110 which are accumulated in accumulator 111.

Comparator 104 also activates transmission gate 107 which passes timing pulses from clock 109 to digital counter 112. Counter 112 measures the net time during which the speech signal exceeds the threshold level setting of setting device 105. The accumulated count in accumulator 111 is divided by the accumulated count in digital counter 112 in dividing network 113. This division process may be performed after the speech signal has exceeded the threshold level for a specified time or it may be determined for any period during which the speech level exceeds the threshold level. Divide network 113 produces the average of the speech signal squared which is $V_{rms}$ in volts. This quantity is passed through converter 114 which changes $V_{rms}$ to decibels. Converter 114 changes volts RMS to power by using a zero db power level as 0.775 volt RMS which is the voltage necessary to dissipate one milliwatt of power in a 600 ohm resistor.

It was shown above that the derived relationship between $V_{rms}$ above-threshold and peak above-threshold shown in FIG. 2, curve 2, could be approximated by a series of connected straight lines. The line between points 200 and 201 is applicable for a specified range of differences between $V_{rms}$ and the threshold level in db. Similarly, the other straight lines of curve 2 of FIG. 2 are applicable to other specified differences between the $V_{rms}$ and the threshold level in db. Comparator 115 relates to the first straight line between points 200 and 201, while comparators 116 and 117 relate to the second and third straight lines, respectively. It is to be understood that any number of comparators may be used relating to any number of straight line approximations. $V_{rms}$ in db as developed in converter 114 is fed to comparators 115, 116, and 117, while the threshold level developed in network 105 is also fed to comparators 115, 116, and 117. Each of these comparators will read out only when the difference between $V_{rms}$ and the threshold level falls within its specified range.

A quantity $\Delta$, which is dependent upon the difference between $V_{rms}$ and the threshold level, is developed in networks 118, 119, and 120. If comparator 115 is activated, $\Delta_1$ will be formed by network 118, the parameters of which are determined by the straight line between points 200 and 201. Similarly, if comparator 116 is enabled; that is, if the difference between $V_{rms}$ and the threshold level falls within its specified range, $\Delta_2$, determined by network 119, will be developed. The newly-formed quantity $\Delta$ is added to the threshold level in adder 121, the output of which provides the equivalent peak level. Any other arrangement may be selected for determining the different $\Delta$'s responsive to the difference between $V_{rms}$ and the threshold level.

FIG. 5 illustrates one embodiment of the present invention which provides an equivalent peak level that is consistent over a threshold level variation of 35 db. Curve 2 of FIG. 3 shows the equivalent peak level plotted against varying threshold levels obtained by using the apparatus shown in FIG. 5.

It is to be understood that the embodiments of the invention which have been described are illustrative of the application of the principles of the invention. Numerous modifications may readily be devised by those skilled in the art without departing from the spirit and scope of the invention.

What is claimed is:

1. Apparatus for obtaining a one-dimensional measure of a speech signal level above a selected threshold which comprises:

tranducer means for converting an input speech signal into an electrical signal, means to determine the root-mean-square of the amplitude of the voltage analog of said speech signal when it exceeds a selected threshold level, means to select a voltage of a given threshold level, means to determine the difference between said measured root-mean-square quantity and said selected threshold level, and means responsive to said measured difference to provide a one-dimensional measure of the level of said speech signal.

2. Apparatus as set forth in claim 1 wherein said means to determine said root-mean-square quantity comprises:

means to form the square of the amplitude of said speech signal analog, means for accumulating the squared amplitude during the time the level of said speech signal analog exceeds said selected threshold level, means for determining the net time during which said speech signal analog exceeds said selected threshold level, and means for dividing that accumulated in said accumulating means by the net time as determined by said last-named determining means to obtain the root-mean-square of the amplitude of the measured speech signal analog.

3. Apparatus as set forth in claim 2 wherein said accumulator means comprises:

a comparator for comparing the speech signal analog and said threshold level, a transmission gate enabled by said comparator when said signal analog exceeds said threshold level, a source of clock pulses, a sampling device, said sampling device receiving said square of the amplitude of said speech signal analog and said clock pulses when said signal analog exceeds said threshold level, an analog-to-digital converter connected to said sampling device, said clock pulses also being supplied to said analog-to-digital converter through said transmission gate when said signal analog exceeds said thresold level, and means for accumulating the digital output of said analog-to-digital converter during the time when said signal analog exceeds said threshold level.

4. Apparatus as set forth in claim 2 wherein said means for determining the net time during which said speech signal analog exceeds said selected threshold level comprises:

a comparator for comparing said signal analog and said threshold level, a transmission gate enabled by said comparator when said signal analog exceeds said threshold level, means for providing a series of clock pulses, and a digital counter which receives clock pulses through said transmission gate during the time and said signal analog exceeds said threshold level.

5. Apparatus as set forth in claim 1 wherein said means to provide a one-dimensional measure of the level of said speech signal comprises:

means to form an electrical quantity $\Delta$ which is the difference between said measured root-mean-square quantity in decibels and said selected threshold level in decibels, and means to add said newly-formed quantity $\Delta$ to said threshold level to provide a one-dimensional measure of the level of said speech signal.

6. Apparatus as set forth in claim 5 wherein said means to form said quantity $\Delta$ comprises:

means to form three separate electrical values $\Delta_1$, $\Delta_2$ and $\Delta_3$; $\Delta_1$ being formed when said difference between said measured root-mean-square quantity in decibels and said selected threshold level is in a first specified range, $\Delta_2$ being formed when said difference between said measured room-mean-square quantity in decibels and said selected threshold level is in a second specified range, and $\Delta_3$ being formed when said difference between said measured root-means-square quantity in decibels and said selected threshold level is in a third specified range.

7. Apparatus as set forth in claim 6 wherein said means to form electrical values $\Delta_1$, $\Delta_2$ or $\Delta_3$ comprises:

a first comparator which is activated when said difference between said measured root-mean-square quantity in decibels and said selected threshold level is in a first specified range, a second comparator which is activated when said difference between said measured root-mean-square quantity in decibels and said selected threshold level is in a second specified range, and a third comparator which is activated when said difference between said measured root-mean-square quanity in decibels and said selected threshold level is in a third specified range.

References Cited

UNITED STATES PATENTS

| | | | |
|---|---|---|---|
| 3,200,899 | 8/1965 | Krauss | 181—0.5 X |
| 3,290,592 | 12/1966 | Pharo et al. | 181—0.5 X |
| 3,346,694 | 10/1967 | Brady | 179—1 |

BENJAMIN A. BORCHELT, Primary Examiner

T. H. WEBB, Assistant Examiner

U.S. Cl. X.R.

179—1